United States Patent [19]

Brown

[11] 4,155,759
[45] May 22, 1979

[54] HARD FACING OF METAL SUBSTRATES

[75] Inventor: Harry J. Brown, Lewiston, N.Y.

[73] Assignee: Union Carbide Corporation, New York, N.Y.

[21] Appl. No.: 935,644

[22] Filed: Aug. 21, 1978

Related U.S. Application Data

[63] Continuation-in-part of Ser. No. 784,619, Apr. 4, 1977, abandoned.

[51] Int. Cl.² .................. B22F 3/00; C22C 29/00
[52] U.S. Cl. ..................................... 75/239; 75/204; 428/553; 428/558
[58] Field of Search .................. 75/239, 204; 428/553, 428/558; 228/119

[56] References Cited

U.S. PATENT DOCUMENTS

| 3,737,289 | 6/1973 | Rudy ..................................... 75/239 |
| 3,782,930 | 1/1974 | Shibata ................................. 75/239 |

*Primary Examiner*—Brooks H. Hunt
*Attorney, Agent, or Firm*—Frederick J. McCarthy, Jr.

[57] ABSTRACT

Method for hard-facing substrates is disclosed using a hard facing material consisting essentially of combined vanadium and carbon and minor amount of uncombined carbon with up to 15% by weight cobalt.

7 Claims, 2 Drawing Figures

FIG. 1
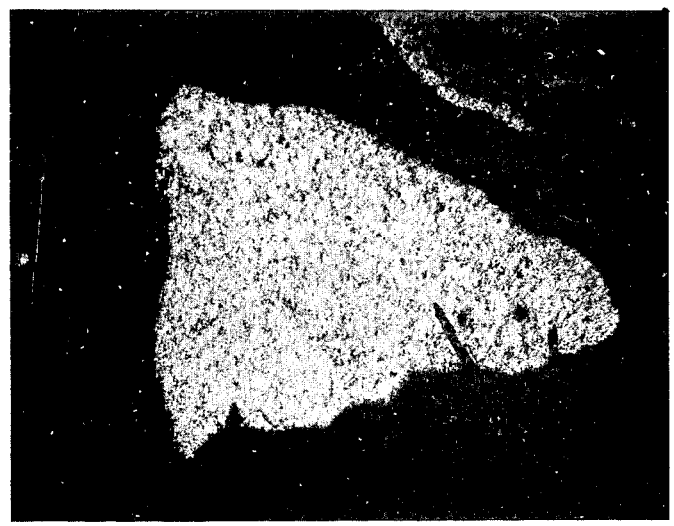
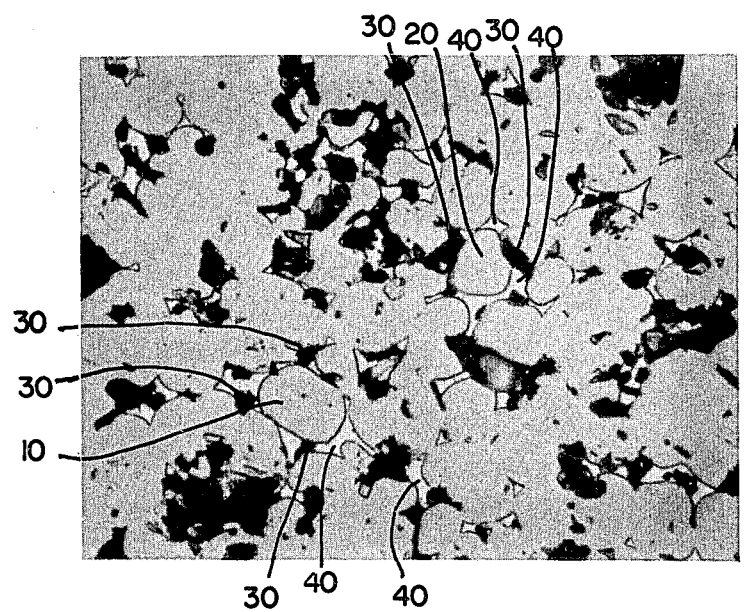
FIG. 2

HARD FACING OF METAL SUBSTRATES

This application is a continuation-in-part of of our prior U.S. application: Ser. No. 784,619, Filed: Apr. 4, 1977 now abandoned.

The present invention relates to the hard facing or iron base alloy substrates. More particularly, the present invention relates to the hard facing of iron based alloy substrates using as the hard-facing material a vanadium carbide and free carbon containing composition to provide improved wear and impact resistance.

Hard facing of substrates, e.g. metal surfaces*, is a common industrial practice, for example, cast particulate tungsten carbide ($W_2C$-WC) or cobalt bonded WC, usually encased in a steel tube, is deposited by hard facing techniques on iron base alloys in making wear resistant cutters, earth moving equipment and the like. It has been found, however, that due possibly to the inherently different physical properties of base metal and tungsten carbide, the hard facing material has a tendency to become unevenly distributed in the molten portion of the metal substrate and as a result, undesired variations in hardness can occur in the resulting solidified hard-faced surfaces.

*The Oxy-Acetylene Handbook, 11th Edition, Linde Air Products Division of Union Carbide Corporation, also Welding Handbook Third Edition, American Welding Society.

Also, during the deposition of both cast and cobalt-bonded tungsten carbide on iron and steel substrates, the molten iron in the substrate dissolves some of the tungsten carbide and upon cooling results in the precipitation of the mixed carbides $(FeW)_6C$ and $Fe_3W_3C$ according to the formula $3WC+9Fe \rightarrow Fe_3W_3C + 2Fe_3C$, thus resulting in substantial depletion of the deposited tungsten into less wear resistant phase.

In instances where tungsten carbide is employed in hard facing, due to the high density of tungsten carbide, a relatively large weight of tungsten carbide is required for adequate hard facing.

It is accordingly an object of the present invention to provide a hard-facing method using vanadium carbide and free carbon containing material to produce a hard-faced surface having wear-resistant properties at least comparable to those provided by the use of conventional tungsten carbide.

Other objects will be apparent from the following description and claims taken in conjunction with the drawing in which FIG. 1 shows a photograph (original magnification 10X) of a granule of hard facing material for use in the present invention.

FIG. 2 is a photomicrograph (original magnification 1500X) of hard facing material for use in the present invention.

The present invention is directed to an improvement in conventional methods of hard-facing substrates which comprises employing as the hard facing material a solid material consisting essentially of chemically combined vanadium and carbon and uncombined or free carbon, the chemically combined vanadium and carbon being combined as $VC_{0.89}$ and the free carbon being in an amount of from about 4.5 to 12.5% by weight of the combined vanadium and carbon. The aforedescribed composition can also contain up to 15% by weight in the aggregate of cobalt, iron, nickel and molybdenum, preferably 3 to 6%.

The above described hard facing material for use in the method of the present invention is formed of vanadium carbide grains, $VC_{0.89}$ having free carbon dispersed between the grains of vanadium carbide. This is exemplified in the photomicrograph of FIG. 2 which is at an original magnification of 1500X and shows the vanadium carbide grains as gray, and free carbon as black areas; exemplary vanadium carbide grains can be seen at 10 and 20 with free carbon indicated at 30. The white areas 40 are cobalt. The composition of FIG. 2 contained 22% carbon (4.5% free carbon) and 3% cobalt.

While various techniques can be used for producing the above described hard facing material from conventional starting materials, including elemental vanadium, carbon, and vanadium oxides, the preferred form of the hard facing material for use in the method of the present invention is a particulated cold pressed and sintered, e.g. under hydrogen atmosphere or vacuum, and subsequently granulated material illustrated by example in the present specification. In these examples, the starting vanadium, carbon, and cobalt materials are blended, compacted and sintered under a hydrogen atmosphere at elevated temperatures, e.g. about 1200°–1600° C. and for periods, e.g. ½ to 3 hours, sufficient to produce material as aforedescribed.

A particular embodiment of the present invention comprises a hard facing rod in conventional form for use in hard-facing iron and iron base alloy metal substrates, e.g. mild steel, Hadfield steels and the like. Such a hard facing rod comprises a metallic sheath or tube formed of the usual metals for such purposes such as iron, steel, and the like containing therein a hard facing composition as previously described.

The hard facing method of the present invention can be used with known gas and electric welding techniques, e.g. gas welding, arc welding and other practices described in the "Master Chart of Welding Processes"—American Welding Society (1969), using conventional fluxes.

In the hard facing of metal substrates in accordance with the present invention by the above-noted conventional techniques the metal substrate and the applied hard facing material become metallurgically bonded.

The following examples illustrate materials for use as hard-facing compositions in accordance with the present invention:

EXAMPLE I

The following materials were used to obtain a cold pressed, sintered hard-facing composition of $VC_{0.89}$ with 4.5% free carbon and 3% cobalt (25% total carbon) for use in the process of the present invention:

(a) 450.8 g of a commercially available material (Union Carbide Corporation) containing mixed $V_2C+VC$, sized 65 mesh and finer having the following analysis:
 83.18% V
 13.21% C
 2.3% O
 0.50% Fe
 Balance moisture and incidental impurities.
(b) 73.2 Acheson* brand G39 graphite powder, sized finer than 100 mesh.
(c) 15 g cobalt powder, extra fine grade from African Metals Corp.

*Trademark of Union Carbide Corporation.

The powders were placed in a ball mill (8-in. diameter × 11 in. high, 10.25 of ½-in. dia. balls) and turned at 110 RPM for 40 hours. After forty hours milling, the material was roll compacted to sheet (density 3.76 grams per cc). The roll compacted material was crushed into granules 12 by 28 mesh. The granules were placed in graphite boats and sintered in a pure hydrogen push-through molybdenum-wound heat-treating furnace. The sintering cycle was as follows: The graphite boat was placed inside the furnace door for ½ hour, to diffuse out residual atmospheric gases. The boat then was advanced to a 900°–1200° C. zone to allow the reduction of any residual oxides and the removal of the reduction products. Then the boat was advanced into the hot zone at 1400° C. for 1½ hr. to provide sintering of the cold pressed material. The boat was then pushed out of the hot zone into a water-cooled chamber and brought to room temperature in 12 minutes. The granules were lightly bonded together but were easily separated in a jaw crusher. Aside from the contained cobalt the material was formed of chemically combined vanadium and carbon, $VC_{0.89}$ and about 4.5% uncombined carbon.

The cold pressed and sintered material as prepared in the foregoing example sized about 12 by 32 mesh and was employed as a hard-facing material in the following manner.

The granules were blended with about 5% of flux having the following composition:

| | |
|---|---|
| 25.00% | Graphite |
| 19.75% | $Al_2O_3$ Powder |
| 20.00% | $Fe_2O_3$ |
| 5.00% | MgO |
| 20.00% | (17.4% Si, 66.1% Mn, 1.7% C) |
| 10.00% | NiO |
| .25% | Borax anhydrous |
| 100.00% | |

The flux was bonded to the grain surface to prevent segregation by wetting the mix with a 50% solution of sodium silicate. A mild steel tube rod with one end crimped was packed with the above grain. The packed relationship is about 50% iron tubing and 50% filler. The tube and filler were then oven dried overnight in vacuum at 90° C. Both ends of the rod are double crimped and the rod is cold rolled to about a 20% reduction in volume to tightly hold the grain. The rod in this form can be used to deposit the hard facing material using standard electric welding practice on an iron base alloy substrate.

EXAMPLE II

Various vanadium, carbon, cobalt hard-facing compositions were prepared following the procedure of Example I as shown in the following Table A.

The hard facing compositions were deposited on plain carbon mild steel substrates and Hadfield steel substrates using electric welding techniques. The melted metal casing bonded the granules to the substrate and a metallurgical bond was formed between the hard facing material and substrate upon solidification of the molten metal.

The resulting hard-faced surfaces were tested for abrasion resistance using a rubber wheel-sand wear and abrasion test. The wear and abrasion test was as follows: A 1 inch×3 inch×½-inch thick steel substrate is hard faced by depositing a hard faced material thereon and the hard faced surface is ground flat. A 9¼ inch O.D. by ½-inch wide neoprene circular disk (durometry hardness shore A 50–60) is used with the hard faced surface being loaded with 28 ft.-lbs. of force against the neoprene disk. Silica sand (sand blast sand size 2, QROK) is fed in excess between the neoprene disk and the hard faced surface with the neoprene disk being turned at 200 RPM for 200 revolutions. The specimen under test is weighed before and after and the procedure is repeated until a constant weight loss is obtained for repeated tests and this weight loss is used as a measure of wear and abrasion resistance. The comparative results obtained are shown in the Table A.

TABLE A

Analysis of Electric Weld Deposits on Mild Steel Substrates

| Aim Hard Facing Composition, % | | | | Hard Facing Material | Electric Weld Deposit on Mild Steel | | Analysis of Electric Weld Deposits on Mild Steel Wt % | | | | | | Electric Weld Deposits on Hadfield Steel | |
|---|---|---|---|---|---|---|---|---|---|---|---|---|---|---|
| V | C | Co | Free Carbon | Rockwell$_A$ Hardness | Rockwell$_A$ Hardness | Wear Test (Grams) Weight Loss | Fe | V | Co | O | N | Total C | Rockwell$_A$ Hard. of Deposits | Wear Test (Grams) Weight Loss |
| 85 | 15 | 3 | — | 90.0 | 70 | .096 | — | — | — | — | — | — | — | — |
| 83 | 17 | 3 | — | 90.5 | 76 | .051 | — | — | — | — | — | — | — | — |
| 82 | 18 | 3 | 0.5 | 91.0 | 76 | .042 | 68.70 | 24.68 | 1.15 | 0.70 | 0.6 | 5.31 | 75 | .024 |
| 78 | 22 | 3 | 4.5 | 81.0 | 76 | .026 | 72.33 | 21.12 | 1.00 | 0.66 | 0.6 | 6.16 | 79 | .013 |
| 75 | 25 | 3 | 7.5 | 75.7 | 80 | .023 | 75.40 | 15.22 | 0.90 | 0.49 | 0.2 | 6.41 | 81 | .067 |
| 70 | 30 | 3 | 12.5 | 29.0 | 80 | .030 | 74.23 | 19.03 | 0.88 | 0.53 | 0.3 | 6.46 | 87 | .067 |

The wear rate of the deposit for the V+25C (7.5% free carbon) material in accordance with the present invention is at least as good as that of cast tungsten carbide and superior to the other vanadium carbon material tested.

A further advantage is the high toughness of the deposit provided by the material in accordance with the present invention. Since vanadium carbide is only slightly soluble in iron, the tempered mortensitic iron matrix in the deposit remains unsaturated and tough.

In the present invention, the presence of free carbon dispersed between the grains of vanadium carbide is considered to inhibit the decarburization, during the hard facing operation, of $VC_{0.89}$ to lower carbides which are not as hard and wear resistant as $VC_{0.89}$.

Free carbon that is dissolved in the molten iron on the substrate will also tend to lower the melting point of the iron making it more fluid and thus facilitating better mixing of the iron and the hard facing carbide which promotes better flowing properties of the weld deposit.

Further tests were performed using hard facing materials prepared following the procedure of Example 1. These results are shown in the following Table B.

As can be seen from Tables A and B the free carbon hard facing materials in accordance with the present invention provide increased hardness and wear resistance in the resulting hard faced substrates.

TABLE B

| Grain Composition | | Milligrams Weight Loss Rubber Wheel-Sand Abrasion Test |
|---|---|---|
| Low Carbon, free Vanadium | 97 V + C (90 V 13.2 C) 3Co | 0.160 |
| VC.89 no free C | 97 V + C (82.8 V 17.5 C) 3Co | 0.125 |
| VC | 97 V + C (81.5 V 18.5 C) 3Co | 0.074 |
| High 7.5% Free Carbon | 97 V + C (75 V 25 C) 3Co | 0.044 |

What is claimed is:

1. In a method for hard facing a surface of an iron base alloy substrate by forming a metallurgical bond between a said surface and hard-facing material by heating said surface to its melting point and depositing hard-facing material thereon, the improvement which comprises employing as hard-facing material a composition which consists essentially of chemically combined vanadium and carbon as $VC_{0.89}$ and free carbon in an amount of about 4.5% to 12.5% by weight of the chemically combined vanadium and carbon.

2. A method in accordance with claim 1 wherein said hard-facing composition is in particulated form.

3. A method in accordance with claim 1 wherein said hard-facing composition is a sintered material in particulated form.

4. A method in accordance with claim 1 wherein said composition contains up to 15% cobalt.

5. A hard-facing rod comprising a metal sheath consisting essentially of a material selected from iron, and steel containing a hard-facing material consisting essentially of chemically combined vanadium and carbon as $VC_{0.89}$ and free carbon in an amount of about 4.5% to 12.5%. by weight of the chemically combined vanadium and carbon.

6. A hard-facing rod in accordance with claim 5 wherein said hard-facing composition is in the form of a sintered material in particulated form.

7. A hard faced metal surface formed by fusing a portion of metal surface, and depositing on the fused portion of said metal surface a solid composition consisting essentially of chemically combined vanadium and carbon as $VC_{0.89}$ and free carbon in an amount of about 4.5% to 12.5% by weight of the chemically combined vanadium and carbon to provide a metallurgical bond between said solid composition and said metal surface.

* * * * *

UNITED STATES PATENT AND TRADEMARK OFFICE
CERTIFICATE OF CORRECTION

PATENT NO. : 4,155,759
DATED : May 22, 1979
INVENTOR(S) : Harry J. Brown

It is certified that error appears in the above—identified patent and that said Letters Patent is hereby corrected as shown below:

Column 1, line 3, "of" second occurrance should be deleted.
Column 1, line 6, "or" should read ---of---.

Signed and Sealed this

Sixteenth Day of December 1980

[SEAL]

Attest:

SIDNEY A. DIAMOND

Attesting Officer    Commissioner of Patents and Trademarks